July 7, 1970   R. H. RUSSELL   3,519,408
METHOD OF TREATING GLASS SURFACES DURING SURFACE EXPANSION
Filed June 19, 1967
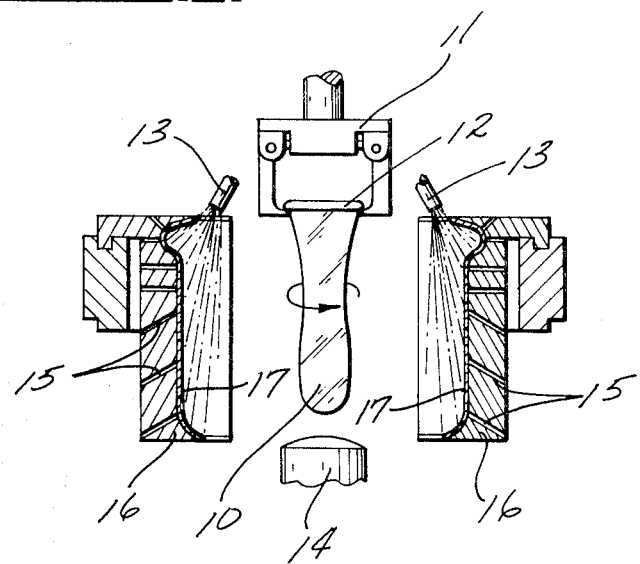
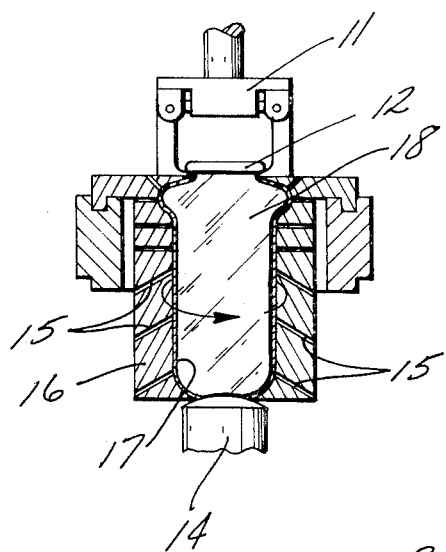
INVENTOR.
RICHARD H. RUSSELL United States Patent Office 3,519,408
Patented July 7, 1970

3,519,408
METHOD OF TREATING GLASS SURFACES DURING SURFACE EXPANSION
Richard H. Russell, Adrian, Mich., assignor to Owens-Illinois, Inc., a corporation of Ohio
Filed June 19, 1967, Ser. No. 647,076
Int. Cl. C03b 39/00
U.S. Cl. 65—24                                    11 Claims

ABSTRACT OF THE DISCLOSURE

A method of forming a glass article in a paste mold and simultaneously depositing on the surface thereof a metallic oxide coating, comprising using water containing a pyrolyzable metal compound or mixtures of such metal compounds in cooling and moistening the paste mold.

---

In the glass industry today, many articles of commerce are treated with various metallic oxides at some stage of the manufacturing operation to improve their abrasion resistance, appearance, electrical conductivity, chemical durability, and other performance characteristics.

For example, conductive coatings are produced on glass surfaces by applying an oxide coating such as tin oxide to the glass substrate at elevated temperatures. This treatment results in an electroconductive surface coating on the glass surface. This electroconductive glass is particularly useful in the windows of airplane cockpits, ships, railway coaches, and automobiles. Glass articles with electroconductive surface coatings are also useful in certain types of electronic circuitry, as well as transistors, insulators, electric heating elements and the like.

Metallic oxide coatings are also applied to glass articles for the purpose of producing decorative coatings. It is well known that certain metallic oxides, particularly the transition metal oxides, produce attractive, highly colored and iridescent coatings on glass articles.

More recently, there has been an increase interest in the use of metallic oxide films on glass articles as a means of enhancing the abrasion resistance of the glass article. This is particularly true in the case of glass containers, such as beer bottles and baby food jars that are formed on "IS" machines; as well as drinking glass tumblers, lamp bulbs and art ware that are formed by paste mold processes. Since these articles receive severe abuse in the course of their service, abrasion resistant coatings are employed as a means of prolonging this service life.

Heretofore, metallic oxide coatings have been applied to the glass substrate by three principle methods:

(1) Spraying the hot glass substrate (600–1300° F.) with a solution or dispersion of a compound of the metal. Under these conditions the metal oxide coating is pyrolyzed onto the glass surface.

(2) Dipping the glass article in a solution or dispersion of a compound of the metal following by maintaining the article at elevated temperatures to effect pyrolysis.

(3) Vaporizing a volatile compound of the metal, and contacting the formed glass article with this vapor at elevated temperatures. This method is widely used in the glass industry today in conjunction with the manufacture of glass containers. In this method, a metallic compound is vaporized and this vapor is confined in a treating chamber or hood. This chamber is positioned over the conveyor that transfers the formed glass container from the forming machine to the annealing lehr in a manner such that the freshly formed glassware must pass through the vapor.

In view of these extensive uses of metallic oxide coatings, there is a continuing need for improved or more economical methods of applying these coatings. This is particularly true in the case of glass articles such as lamp bulbs and tumblers that are formed by the "paste mold" processes.

Accordingly, it is a primary object of the present invention to provide a novel method of applying a metallic oxide coating to glass articles formed by the "paste mold" process.

Another object is to provide an economical method of providing paste molded articles such as lamp bulbs and tumblers having a metallic oxide coating.

A still further object is to provide a method of simultaneously forming and depositing a metallic oxide coating on a glass article during its formation within a paste mold.

The above and other objects, features and advantages of the present invention will become obvious from the following specification taken in conjunction with the drawings wherein:

FIG. 1 is a fragmentary view, mainly in longitudinal vertical section, of a paste mold preparatory to being closed about a glass parison.

FIG. 2 is a fragmentary view similar to FIG. 1 showing the parison inflated within the closed paste mold.

According to the present invention, the method of forming a glass article, in a paste mold by inflating a glass parison within a wet paste mold is improved to provide for the simultaneous formation of a metallic oxide coating on said article as it is formed, by wetting the paste mold with water containing a compound pyrolyzable to a metal oxide before said forming step.

The term "paste mold" is a common term in the glass industry and refers to metallic (usually iron) molds having an inner lining of a porous, water absorbent material upon which the glass parison revolves while it is being blown. Such paste mold linings are characterized by a smooth glass-contacting surface which is porous and is usually a carboneceous material which typically consists of a thin layer of boiled linseed oil that has been dusted with powdered cork and then baked at a temperature of 200–300° C. Molds of this type are widely used in both machine and hand glass blowing operations, and are particularly adapted for the production of articles which have a smooth, and unmarred exterior surface and are symmetrical about at least one axis. Articles produced in this manner include tumblers, lamp bulbs, ash trays, bowls, containers, art ware, etc.

During the forming operation, the paste mold is low in temperatrue, with the glass parison being blown or inflated within the carbonaceous or graphite surface which is adhered to the cast iron base. This paste lining is run wet by dipping or spraying the mold with water between successive blowing operations, which water partially escapes as steam before glass contact. The glass article being formed or in some cases, the paste mold itself, rotates as the blowing occurs, so any such article must be circular in cross section. In this manner, the glass article is actually inflated or expanded against a steam vapor cushion. The blow air pressure is quite low. By rotating the parison during blow forming and by providing the steam cushion between parison and mold cavity surface, the article of glassware, when finished, will be formed without mold seams or similar marks being present.

Methods and apparatus for forming glass articles in paste molds are known in the art and are described in several U.S. patents such as 1,527,556, 1,790,397 and 1,124,702.

The figures illustrate a typical paste mold forming operation wherein the aqueous lubricant is a pyrolyzable solution of a metallic compound. In operation, a charge of molten glass is formed into a parison 10 in a parison mold (not shown). The parison is then positioned between the two halves of the paste mold 16 by the gripper mechanism 11. While the paste mold halves are open, the internal paste-coated surfaces 17 are wet with the pyrolyzable spray solution through the nozzles 13. The bottom plate 14 can also be covered with the paste composition, in which case it is also sprayed with the pyrolyzable solution. The spray cycle is, of course, in synchronization with the forming cycle. The halves of the paste mold are provided with passages 15 through the walls thereof to conduct away the excess spray solution and steam that subsequently forms during the blowing process.

The paste mold halves are then closed about the parison as shown in FIG. 2 and the parison is inflated within the closed paste mold by air pressure applied through the open end or finish 12 of the parison. The air pressure source is of conventional design and is not shown in the drawings.

The gripper mechanism rotates the parison while the parison is being inflated to eliminate mold seams in the finished glass article. When the parison is inflated within the paste mold to form the glass jar 18 as shown in FIG. 2, the spray solution vaporized and the metallic oxide is pyrolyzed onto the glass surface as the glass article forms. As the solution vaporizes, the metallic solute contacts the hot glass surface and is pyrolyzed thereon forming an integrally bonded metal oxide coating.

The term "pyrolyze" when used herein refers to chemical decomposition of a metallic compound under the influence of heat to form the metal oxide.

Without in any way limiting the method of the invention, the following metals whose pyrolyzable compounds are suitable in this method to produce the oxide coatings, can be mentioned as exemplary: zinc, cadmium, aluminum, indium, thallium, silicon, titanium, germanium, zirconium, tin, lead, thorium, columbium, antimony, copper, vanadium, bismuth, chromium, molybdenum, tungsten, manganese, iron, cobalt and nickel.

Inorganic compounds which are generally suitable include salts of the inorganic acids and include the halides particularly the chlorides, which are generally the most suitable, as well as iodides, bromides, fluorides, sulfates, nitrates and the like.

Organic salts and compounds of the recited metals are not always readily available but such compounds can be used provided they can be dissolved or otherwise intimately dispersed in water.

In the usual manner of carrying out my invention, an aqueous solution of the metal salt is suitably applied to the paste mold surface, which is then heated by the hot parison to vaporize the water and pyrolyze the metal oxide on the glass surface. This heating is effected as a result of a normal glass blowing operation, following which the mold is wet with the aqueous metal salt solution as the mold cools. The mold is then ready for the shaping of another parison of glass, this cycle of heating and cooling being repeated as desired.

The usual compounds for carrying out the present invention for the purpose of enhancing the abrasion resistance are pyrolyzable compounds of titanium and tin. The titanium and tin containing compound which are employed for purposes of the present invention are those which upon contact with the heated glass surface will react to form a substantially colorless, transparent layer or coating of an oxide of the metal, primarily $TiO_2$ or $SnO_2$, on the glass surface. The oxide layer is tightly adherent to the surface of the glass and is believed to have an average thickness of up to about one micron, and preferably less than one micron.

Among the titanium-containing compounds suitable for purposes of the present invention are the alkyl titanates, preferably wherein the alkyl group contains from 1 to about 8 carbon atoms, and including tetrabutyl titanate, tetraisopropyl titanate and the like. Also included among the suitable titanium-containing compounds are the titanium tetrahalides, and particularly titanium tetrachloride. These titanium compounds form pyrolyzable solutions when dissolved in dilute acid solutions.

The tin compounds that may be used for the purpose of the present invention include both stannous and stannic compounds. Among the suitable stannic compounds are the stannic halides, which are exemplified by stannic chloride, stannic bromide, and stannic iodide. These tin compounds dissolve in acidified aqueous solutions to form pyrolyzable solutions.

Among the stannous tin compounds that can be dissolved in water and in dilute aqueous solutions to form pyrolyzable solutions are the stannous dihalides, such as stannous chloride, stannous bromide, and stannous iodide.

The following examples illustrate the present invention in specific detail although they should not be interpreted as being limiting.

EXAMPLE 1

Ten ml. of stannic chloride ($SnCl_4$) is added to 9 liters of water. The $SnCl_4$ hydrolyzed, and a solution is formed. The solution concentration, calculated on the basis of $SnCl_4$, is about 0.25% by weight. A conventional hand paste mold is dipped in this tin solution at room temperature.

The mold is then heated and glass bottles are blown in this mold according to conventional techniques. The bottles thus formed are observed to have a clear, transparent coating of tin oxide thereon. The presence of the metallic oxide film is evidenced by the slightly increased surface reflectance of the finished glassware.

EXAMPLE 2

Glass bottles are formed in a paste mold according to the technique of Example 1 except that the paste mold is dipped in the solution formed when 110 ml. of stannic chloride are added to 9 liters of water. The solution concentration, calculated as $SnCl_4$ is about 2.6% by weight.

The ware thus formed is observed to have a coating of tin oxide thereon. The tin oxide coating is observed quite heavy and the glassware is attractively iridescent.

EXAMPLE 3

This example demonstrated the application of the present invention to automatic glass blowing machinery such as the "ribbon machine" used in blowing electric lamp bulbs. Such a machine is disclosed in U.S. Pat. No. 1,790,397.

In operation, this machine is fed a uniform stream of glass flowing vertically from an opening in a continuous melting tank. The stream is received between water cooled rolls, one of which is smooth, and the other with cup-like depressions or pockets spaced at regular intervals. The cylindrical stream of glass is thus converted into a flat ribbon, with "biscuits" of molten glass upon it at spaced intervals. This ribbon is received upon a moving endless belt. Each biscuit is in alignment with a hole or opening in the belt itself. The molten glass biscuits sag through these openings in the belt forming hollow drops. These hollow drops are then blown against paste molds to form the lamp bulb. The bulbs remain a part of the ribbon throughout the blowing operation and the molds are cycled on a continuous belt. As the molds are being returned between blowing operations, they pass through a continuous spray of cooling water.

In the application of the present invention to such a machine, the cooling water is replaced by an aqueous pyrolyzable solution of a metallic compound such as either of the solutions used in Examples 1 and 2. The lamp bulbs produced under such circumstances have a tightly adherent, permanent external tin oxide coating.

As will be evident to those skilled in the art, various modifications of this invention can be made or followed in the light of the foregoing disclosure and discussion without departing from the spirit or scope of the disclosure or from the scope of the claims.

What is claimed is:

1. The method of forming a hollow glass article comprising forming a pre-formed hollow shape of plastic, formable glass, treating the porous molding surface of a blowing mold with a vaporizable solution containing a pyrolizable metal compound convertible to the metallic oxide, said solution being absorbed in the pores of said molding surface, enclosing the pre-formed glass by the blowing mold, the heat from the glass being exchanged to convert said solution in said pores to a vapor disposed between the glass and the molding surface, relatively rotating the glass preform and the mold about a central axis, blowing said glass preform to expand it to the shape of the mold simultaneously with said relative rotation of glass and mold, the expanding glass contacting only the vapors formed from said solution, the latter being under pressure during expansion of the glass in the mold and providing a vapor cushion between the relatively rotating glass and mold, simultaneously pyrolizing the metal compound of said vapor by heat extracted from the glass to form a metal oxide coating on the exterior of the glass while the latter is undergoing expansion in the mold, and removing the mold to release the formed, seamless hollow article of glassware having a bonded metal oxide coating thereon.

2. The method of claim 1, wherein the solution containing a pyrolizable metal compound comprises said metal compound dissolved in water to form an aqueous solution, and the metal compound is a member selected from the group consisting of the halide salts of titanium and tin.

3. The method of claim 2 wherein said halide salt is stannic chloride.

4. The method of claim 2 wherein said halide salt is stannous chloride.

5. The improvement of claim 2 wherein the halide salt is titanium tetrachloride.

6. The method of forming a hollow glass article comprising forming a hollow glass pre-forming shape in a ribbon of plastic, formable glass, said shape depending integrally from said ribbon with its central axis vertical, applying an aqueous solution containing a volatile, pyrolizable metal compound convertible to the metallic oxide onto the porous molding surface of a blowing mold, the solution being stored in pores of said molding surface, closing the mold about the preformed glass shape of said ribbon, the heat from the glass being exchanged in said mold to convert said solution stored in said molding surface to a vapor forming a cushion between the glass and the said molding surface, rotating the closed mold about the central axis of said glass preform shape, simultaneously blowing said glass preform shape to expand it within the mold during said mold rotation, the exterior glass surface intimately and continuously contacting the said vapor containing the metal compound during the expansion of the glass in the mold, simultaneously pyrolizing the metal compound of said vapor on said glass surface and forming a metal oxide coating thereon during said expansion by heat from the glass, and opening the mold from about the formed, seamless hollow article of glassware having a bonded metal oxide exterior coating thereon.

7. The method of claim 6, wherein said aqueous solution is the solution formed by dissolving in water, a member selected from the group consisting of the halide salts of titanium and tin and mixtures thereof.

8. The method of claim 7, wherein said solution concentration is less than about 5% by weight calculated on the basis of said halide salt.

9. The method of claim 7 wherein said halide salt is stannic chloride.

10. The method of claim 9 wherein said solution concentration ranges from about 0.2 to about 3% by weight.

11. The method of forming a hollow glass article comprising forming a hollow parison from plastic, formable glass, treating the porous molding surface of a blowing mold with an aqueous solution containing a metal compound that is pyrolizable to form a metal oxide, said solution being absorbed in the pores of said molding surface, enclosing said parison in a blowing mold, the heat from the glass being exchanged to convert said solution in said pores to a vapor disposed between said parison and the molding surface, rotating said parison in the mold about a central axis, blowing said parison to expand it to the shape of the mold simultaneously with said rotation thereof, the expanding parison contacting only the vapors of said solution, the vapor forming a cushion under pressure in the mold as the parison is blown separating the rotating glass from surface contact on the mold surface, simultaneously pyrolizing the metal compound of said vapor to form a metal oxide coating on the exterior of the glass while the parison is undergoing said expansion and rotational movement by heat from the glass, and removing the mold to release the formed, seamless hollow article of glassware having a bonded metal oxide exterior coating thereon.

References Cited

UNITED STATES PATENTS

| 2,246,463 | 6/1941 | Garratt | 65—26 XR |
| 2,486,153 | 10/1949 | Gwyn | 65—24 |
| 2,478,817 | 8/1949 | Gaiser | 65—60 XR |
| 2,617,741 | 11/1952 | Lytle | 65—60 XR |
| 3,347,650 | 10/1967 | Barkhan | 65—26 |
| 3,352,707 | 11/1967 | Pickard | 65—60 XR |
| 3,420,693 | 1/1969 | Scholes | 65—60 XR |

FRANK W. MIGA, Primary Examiner

U.S. Cl. X.R.

65—26, 60, 30; 117—124